US012608602B2

(12) United States Patent
Kim et al.

(10) Patent No.: US 12,608,602 B2
(45) Date of Patent: Apr. 21, 2026

(54) DEVICE AND METHOD FOR DEFECT INSPECTION BASED ON EXPLAINABLE ARTIFICIAL INTELLIGENCE

(71) Applicant: HYUNDAI MOBIS CO., LTD., Seoul (KR)

(72) Inventors: Tae Hyun Kim, Seoul (KR); Jung Kyu Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 1146 days.

(21) Appl. No.: 17/352,017

(22) Filed: Jun. 18, 2021

(65) Prior Publication Data

US 2022/0300805 A1 Sep. 22, 2022

(30) Foreign Application Priority Data

Mar. 16, 2021 (KR) ......................... 10-2021-0033928

(51) Int. Cl.
G06N 3/08 (2023.01)
G06N 3/04 (2023.01)
(52) U.S. Cl.
CPC ................. G06N 3/08 (2013.01); G06N 3/04 (2013.01)
(58) Field of Classification Search
CPC . G06N 3/08; G06N 3/04; G06N 3/045; G06T 7/0002; G06T 2207/20081; G06T 2207/20084; G06T 7/0004; G01N 21/88
USPC .......................................................... 706/20
See application file for complete search history.

(56) References Cited

FOREIGN PATENT DOCUMENTS

| | | |
|---|---|---|
| CN | 106290378 A | 1/2017 |
| CN | 108830837 A | 11/2018 |
| CN | 110298839 A | 10/2019 |
| JP | H09179985 A | 7/1997 |

OTHER PUBLICATIONS

Zhu, Yue, Kai Ming Ting, and Zhi-Hua Zhou. "Multi-label learning with emerging new labels." IEEE Transactions on Knowledge and Data Engineering 30.10 (2018): 1901-1914. (Year: 2018).*
Zhang, Linlin, et al. "Convolutional neural network-based multi-label classification of PCB defects." The Journal of Engineering 2018.16 (2018): 1612-1616. (Year: 2018).*
Tavanaei, Amirhossein. "Embedded encoder-decoder in convolutional networks towards explainable AI." arXiv preprint arXiv: 2007.06712 (2020). (Year: 2020).*

(Continued)

*Primary Examiner* — Abdullah Al Kawsar
*Assistant Examiner* — Jun Kwon
(74) *Attorney, Agent, or Firm* — NovoTechIP International PLLC

(57) ABSTRACT

An AI based defect inspecting device and method is disclosed. The present embodiment, in determining the good or defective product using the deep learning-based classification model based on an image of the product, provides a defect inspecting device and method for providing a basis for determining a good/defective product provided by a deep learning-based classification model using explainable AI (XAI) generating a category set for the basis, and continuously updating parameters of the deep learning-based classification model using the category set.

5 Claims, 5 Drawing Sheets

CLASSIFICATION MODEL     SECOND CLASSIFICATION MODEL

LOSS FUNCTION : $L_{match}(z_1, z_2)$

(56) References Cited

OTHER PUBLICATIONS

Das et al, Mar. 8, 2021 "Explainable AI for Robot Failures: Generating Explanations that Improve User Assistance in Fault Recovery" (Year: 2021).*

Angelov & Soares, "Towards explainable deep neural networks (xDNN)", 2020 (Year: 2020).*

Chinese Office Action issued Jan. 27, 2025 in corresponding Chinese Patent Application No. 2021108581205.5.

* cited by examiner

<u>*100*</u>

LOSS FUNCTION : $L_{match}(z_1, z_2)$

CLASSIFICATION MODEL

LOSS FUNCTION : $L_{class}(y_1, y^t)$

DEVICE AND METHOD FOR DEFECT INSPECTION BASED ON EXPLAINABLE ARTIFICIAL INTELLIGENCE

CROSS-REFERENCE TO RELATED APPLICATIONS

This application claims the benefit of Korean Patent Application No. 10-2021-0033928, filed on Mar. 16, 2021 in the Korean Intellectual Property Office, the disclosure of which is incorporated herein in its entirety by reference.

BACKGROUND

1) Field

The present disclosure relates to a defect inspecting device and method based on explainable artificial intelligence (XAI). More particularly, in determining the good/defective product using the deep learning-based classification model based on an image of the product, the present disclosure relates to a defect inspecting device and method that provide a basis for determining a good/defective product provided by a deep learning-based classification model using explainable artificial intelligence (XAI), generate a category set for the determination basis, and continuously update parameters of the deep learning-based classification model using the category set.

2) Description of Related Art

The statements in this section merely provide background information related to the present disclosure and do not necessarily constitute prior art.

In comparison with a defect inspecting method using a rule-based algorithm, a deep learning-based defect inspecting method has an advantage that a quality management level can be improved by performing more sophisticated product inspection. However, when deep learning technology is applied to an actual process, management supervision may be difficult over existing rule-based machine vision techniques. This is because the deep learning-based defect inspecting method may not present a clear basis for determining whether a product is good/defective. Thus, when a defect occurs, it may be difficult not only to analyze a cause, but also to check whether or not an algorithm is normally operated. This problem can act as a technical barrier when a deep learning-based algorithm is applied to an actual process despite the proven performance for the deep learning-based algorithm.

Further, the defect inspecting method to which deep learning-based machine vision is applied provides only two results of good/defective despite the presence of various bases for determining good/defective. Parameters of the deep learning algorithm need to be updated due to environmental changes or the occurrence of process issues. When update of the parameters of the deep learning algorithm does not proceed in a timely manner because only the determination results are provided, the deep learning algorithm may cause continuous misdetermination of the product later on. A low nonadjusted ratio caused by the continuation of this misdetermination can ultimately cause serious damage in a production process. Therefore, in view of the utilization and maintenance of the defect inspecting method, a solution for presenting an explainable basis for the determination result of the deep learning algorithm, and a solution for updating the deep learning algorithm based on the explainable basis need to be considered.

SUMMARY

The present disclosure, in determining the good/defective product using the deep learning-based classification model based on an image of the product, is directed to providing a defect inspecting device and method for adapting a deep learning-based classification model to an environmental change by providing a basis for determining a good/defective product provided by the deep learning-based classification model using explainable artificial intelligence (XAI), by generating a category set for the determination basis, and by continuously updating parameters of the deep learning-based classification model using the category set.

In accordance with one aspect of the present disclosure, provided is a method of operating a computing device for defect inspection, comprising: acquiring an image of a product to be inspected; generating a determination result indicating whether the product is good or defective based on the acquired image using a deep learning-based first classification model, and providing a determination basis for the determination result, wherein the first classification model has one or more parameters that are same as those of a second classification model that is pre-trained or stored in a data storage after being updated; and performing an adaptation process on the first classification model when the determination basis is determined as being an abnormal value, wherein performing the adaptation process comprises: updating a category set including a plurality of categories for the determination basis; and training the first classification model using the second classification model and the updated category set.

In accordance with another aspect of the present disclosure, provided is an apparatus for defect inspecting, including an input unit configured to acquire an image of a product to be inspected; a product inspection unit configured to generate a determination result indicating whether the product is good or defective based on the acquired image using a deep learning-based first classification model, and to provide a determination basis for the determination result, wherein the first classification model has one or more parameters that are same as those of a second classification model that is pre-trained or stored in a data storage after being updated; and an adaptation unit configured to perform an adaptation process on the first classification model when the determination basis is determined as being an abnormal value, wherein the adaptation unit comprises: a category set generation unit configured to update a category set including a plurality of categories for the determination basis; and a training unit configured to train the first classification model using the second classification model and the updated category set.

In accordance with another aspect of the present disclosure, provided is a non-transitory computer-readable recording medium having instructions stored thereon, wherein the instructions cause the computer to perform acquiring an image of a product to be inspected; generating a determination result indicating whether the product is good or defective based on the acquired image using a deep learning-based first classification model, and providing a determination basis for the determination result, wherein the first classification model has one or more parameters that are same as those of a second classification model that is pre-trained or stored in a data storage after being updated;

and performing an adaptation process on the first classification model when the determination basis is determined as being an abnormal value, wherein performing the adaptation process comprises: updating a category set including a plurality of categories for the determination basis; and training the first classification model using the second classification model and the updated category set.

As described above, according to the present embodiment, a defect inspecting device and method for providing a basis for determining a good/defective product provided by a deep learning-based classification model using explainable artificial intelligence, generating a category set for the basis, and continuously updating parameters of the deep learning-based classification model using the category set are provided, and thereby there is an effect that, in view of utilization and maintenance of a deep learning algorithm, real-time adaptation to a cause of a defect caused by an environmental change and a flexible countermeasure to a new type of defect are enabled.

Further, according to the present embodiment, a defect inspecting device and method for providing a basis for determining a good/defective product provided by a deep learning-based classification model using explainable artificial intelligence, are provided, and thereby there is an effect that new know-how associated with a production process can be accumulated by grasping a specific potential defect element causing the basis for determining good/defective within an image.

DETAILED DESCRIPTION

Figure 1:
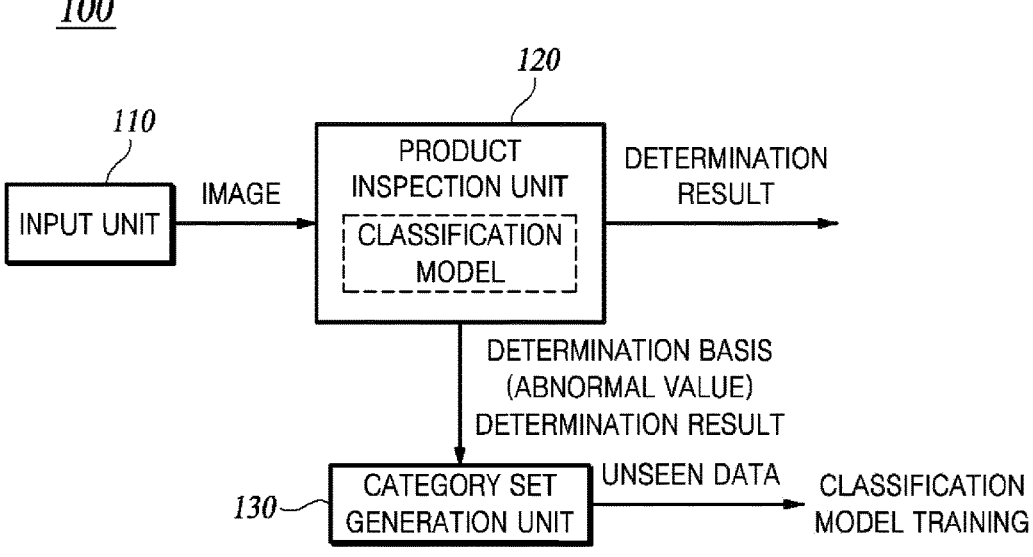
FIG. 1 is a conceptual block diagram of a defect inspecting device according to an embodiment of the present disclosure.

Hereinafter, some embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. Further, the terms such as 'unit', 'module', and the like refer to one or more units for processing at least one function or operation, which may be implemented by hardware, software, or a combination thereof.

The detailed description to be made below along with the attached drawings is intended to describe exemplary embodiments of the present invention, and is not intended to represent the only embodiments in which the present invention can be carried out.

The present embodiment discloses a description of an AI based defect inspecting device and method. More specifically, in determining the good/defective product using the deep learning-based classification model based on an image of the product, the present embodiment provides a defect inspecting device and method for providing a basis for determining a good/defective product provided by a deep learning-based classification model using explainable AI (XAI) generating a category set for the basis, and continuously updating parameters of the deep learning-based classification model using the category set.

In the following description of the present disclosure, the classification model represents the same deep learning-based neural network as a first classification model. Meanwhile, a second classification model is a neural network having the same structure as the first classification model, and is used to back up the first classification model. The second classification model may also be used in a process of updating parameters of the first classification model.

FIG. 1 is a conceptual block diagram of a defect inspecting device according to an embodiment of the present disclosure.

According to the present embodiment, a defect inspecting device 100 determines whether a product is good/defective based on an image of the product using a deep learning-based classification model. Further, the defect inspecting device 100 provides a basis for determining a good/defective product provided by the classification model using explainable AI (XAI), generates a category set for the determination basis, and continuously updates parameters of the classification model using the category set. The defect inspecting device 100 includes all or some of an input unit 110, a product inspection unit 120, and a category set generation unit 130. Here, the components included in the defect inspecting device 100 according to the present embodiment are not necessarily limited thereto. For example, the defect inspecting device 100 may further include a training unit (not illustrated) for pre-training and training the classification model, or may be implemented in a form interworking with an external training unit.

The configuration illustrated in FIG. 1 is an exemplary configuration according to the present embodiment, and various implementations including different components or different connections between components depending on the type of input, the type of XAI-based determination basis, a structure of the classification model, a category set generating method, etc. are possible.

The input unit 110 acquires an image of a product from a machine vision camera. Here, the image is acquired by capturing a target product to be inspected. For example, when a printed circuit board (PCB) included in the target product is inspected, the image is acquired by capturing the PCB. When an appearance of the target product is inspected, the image may be acquired by capturing the appearance of the product. Further, when the target product includes a displayer, a displayed image may be captured by a machine vision camera.

The product inspection unit 120 generates a result of determining whether a product is good/defective based on the image using the deep learning-based classification model (the first classification model). Further, the classification model generates an XAI-based determination basis for the determination result. The determination basis may be expressed as an intuitively recognizable visual result. The product inspection unit 120 may provide the determination basis in the form of a heat map on an image used as an input.

Figure 2:
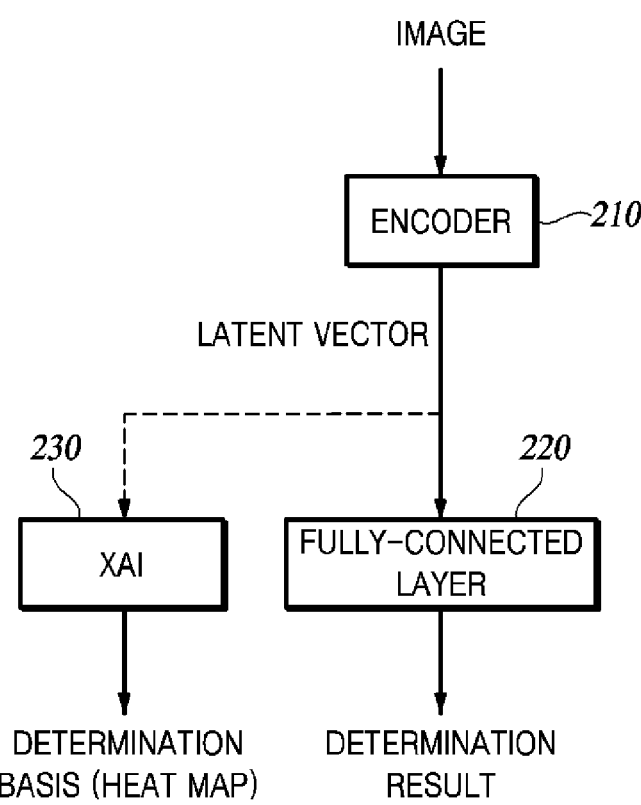
FIG. 2 is a block diagram conceptually illustrating a classification model according to an embodiment of the present disclosure.

As illustrated in FIG. 2, the classification model (also, the second classification model) includes an encoder 210, a fully-connected layer 220, and XAI 230. Here, the encoder 210 performs a function of extracting a feature map from an image of a product, and may be implemented using, for example, a convolutional neural network (CNN) which is a neural network known to be suitable for image processing. Hereinafter, the feature map extracted and finally output by the encoder 210 is represented as a latent vector.

The fully-connected layer 220 generates a result of determining whether a product is good/defective based on the latent vector that is the output of the encoder 210.

Meanwhile, the XAI 230 generates a determination basis corresponding to the determination result using the latent vector. The XAI 230 is an algorithm having fixed parameters. As such XAI algorithms, a response map-based class activation mapping (CAM) and attention branch network (ABN) algorithm, and saliency mask-based gradient-weighted CAM (GradCAM) and GradCAM++ algorithms may be used.

The training unit according to the present embodiment pre-trains the second classification model using seen data for learning and a corresponding target determination result. Here, the seen data represents an image that is previously secured for pre-training.

The training unit defines a loss function based on a distance between a determination result inferred by the second classification model based on the seen data and a target determination result, and performs pre-training by updating parameters of the second classification model toward a direction in which the loss function is reduced. Here, the distance, such as an L1 metric and an L2 metric, may be any one that can represent a distance difference between two comparison objects.

Meanwhile, in the pre-training process, the training unit may update parameters of all the components (the encoder 210 and the fully-connected layer 220) of the second classification model.

After the pre-training of the second classification model is completed, the category set generation unit 130 initializes the category set by classifying the heat maps those are the determination basis generated from the seen data by the second classification model and generating a plurality of categories for the results of determining good/defective. A k-means, a k-nearest neighbors (kNN), a Gaussian mixture model (GMM), or the like may be used as a categorizing algorithm for categorizing the determination basis. The categorizing algorithm may perform categorization on the determination basis by grouping similar determination bases into a group based on similarity among the determination bases. Here, a Euclidean distance, a Mahalanobis distance, a density function, etc. may be used as the similarity.

The category set may be represented as a sum of sets that are a set of the categories corresponding to the result of determining good and a set of the categories corresponding to the result of determining defective. The category set includes a representative heat map (or a representative vector) for each of the included categories. The representative heat maps may be differently generated depending on the categorizing algorithm and similarity used to categorize the determination basis.

The product inspection unit 120 copies the parameters of the second classification model, which is pre-trained or stored in a data storage after being updated, to a classification model, and then performs inspection of a defect using the classification model.

When an abnormal value occurs in the determination basis, the product inspection unit 120 transmits the corresponding determination basis and determination result to the category set generation unit 130. Here, when a difference in similarity between an arbitrary determination basis and the representative heat map for each of the categories included in each category set is greater than a preset reference value, this arbitrary determination basis is expressed as an abnormal value.

Meanwhile, the abnormal value may occur regardless of whether the determination result is good or defective.

When the abnormal value occurs in the determination basis, the category set generation unit 130 may update the category set by classifying the abnormal value as a new determination basis. The updated category set may be used to check the occurrence of an abnormal value among the determination bases in a subsequent defect inspection process for the next product.

The category set generation unit 130 classifies an image, which causes the classification model to generate an abnormal value and the corresponding determination result, as unseen data. Further, the category set generation unit 130 may include the determination result corresponding to the abnormal value in a target determination result for training, and thereby update the target determination result. The category set generation unit 130 provides the unseen data, the updated target determination result, and the like to the training unit.

The training unit may perform training on the classification model using (i) the stored seen data and second classification model, and (ii) the unseen data and the updated target determination result. The training process for the classification model will be described below.

Figure 3:
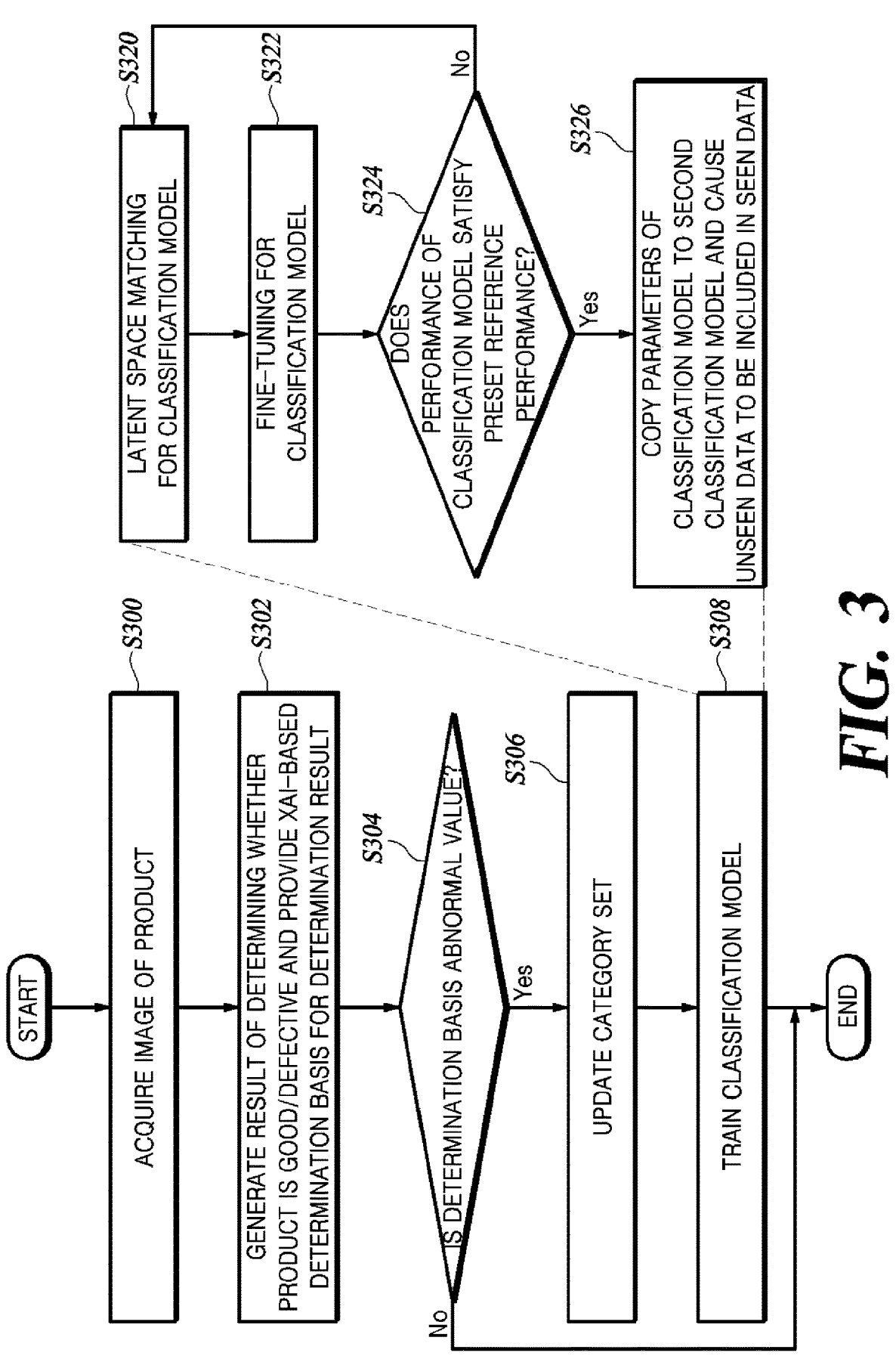
FIG. 3 is a flow chart of a defect inspecting method according to an embodiment of the present disclosure.

FIG. 3 is a flow chart of a defect inspecting method according to an embodiment of the present disclosure.

The defect inspecting device 100 acquires an image of a product to be inspected (S300).

The defect inspecting device 100 generates a result of determining whether the product is good/defective based on the image using the classification model, and provides an XAI-based determination basis for the determination result (S302). Here, the classification model is generated by copying parameters of the pre-trained second classification model. Alternatively, the classification model has the same parameters as the second classification model stored in a data storage after being updated. As described above, the training unit of the defect inspecting device 100 may perform pre-training on the second classification model based on the seen data for learning and the corresponding target determination result.

The defect inspecting device 100 determines whether or not the determination basis of the product is an abnormal value using the category set (S304). Here, when a difference in similarity between an arbitrary determination basis and the representative heat map for each of categories included in the category set is greater than a preset reference value, this arbitrary determination basis is expressed as an abnormal value.

When the determination basis is not an abnormal value, the inspection process for the product is terminated, and a defect inspection for the next product can be continued.

When the determination basis is an abnormal value, the defect inspecting device 100 performs an adaptation process on the classification model.

In another embodiment of the present disclosure, when a preset number or more of products having an abnormal value is accumulated, the adaptation process for the classification model may be performed.

The adaptation processes for the classification model (S306 and S308) are as follows.

The defect inspecting device 100 updates a category set (S306). The defect inspecting device 100 can update the category set by classifying an abnormal value as a new determination basis. The updated category set may be used to check the occurrence of the abnormal value among the determination bases in a subsequent defect inspection process for the next product.

The defect inspecting device 100 classifies an image, which causes the classification model to generate an abnormal value and the corresponding determination result, as unseen data. Further, the defect device 100 can update the target determination result by including a good/defective determination result, which corresponds to the abnormal value, in the target determination result for training. The defect inspecting device 100 provides the unseen data, the updated target determination result, and the like to the training unit.

As described above, according to the present embodiment, the defect inspecting device 100 updates the existing category set instead of generating a new category set with respect to the occurrence of the abnormal value, and thereby there is an effect that the defect inspecting device can operate continuously without interruption of the defect inspection process caused by the generation of new data.

The defect inspecting device 100 trains a classification model using the second classification model and the updated category set (S308).

The training process for the classification model includes a latent space matching process (S320) and a fine-tuning process (S322) for the classification model.

The fine-tuning process for the classification model is a process of adapting the classification model to unseen data. Depending on the application of the fine-tuning process using the unseen data, a latent vector generated by the encoder 210 of the classification model based on seen data may be affected. The latent space matching process may be performed to reduce this effect. Further, when it is possible to suppress an influence on the latent vector, it is not necessary to give variability to the fully-connected layer 220. Accordingly, in the training process for the classification model, parameters of the encoder 210 may be updated while the fully-connected layer 220 inside the classification model is still fixed.

Figure 4:
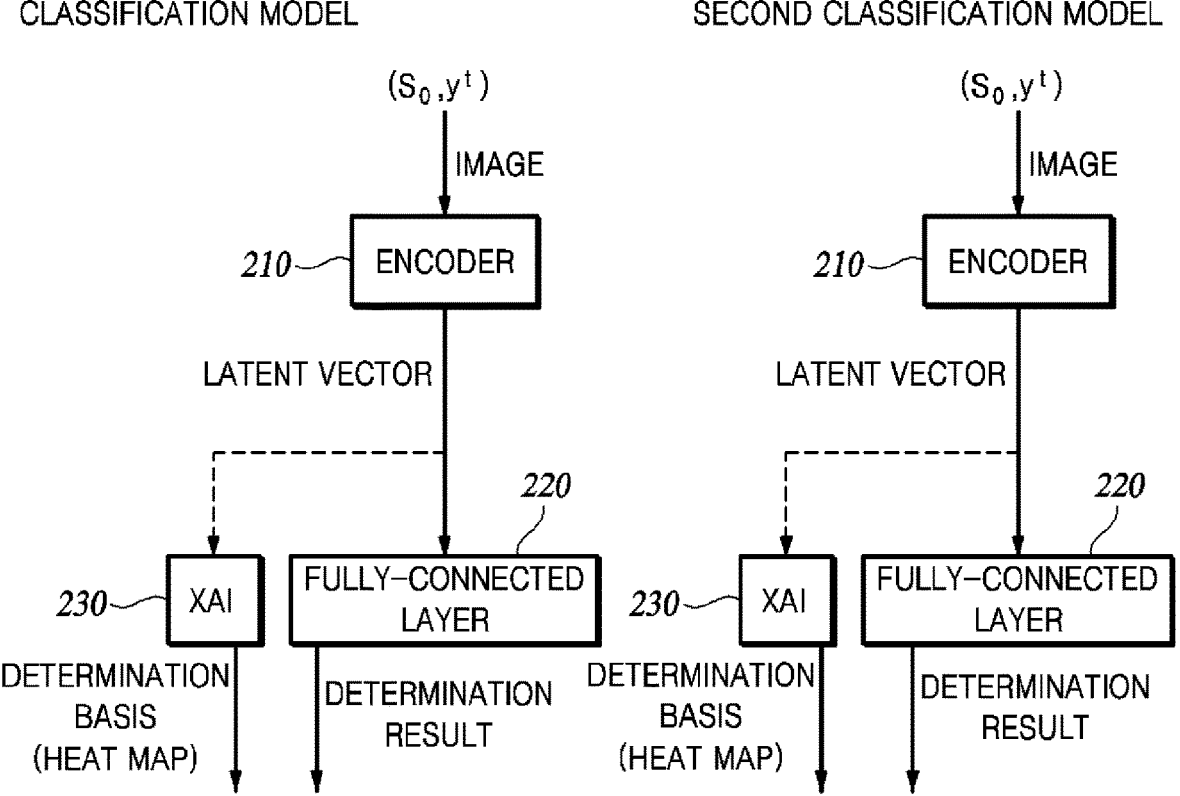
FIG. 4 is an exemplary diagram conceptually illustrating a latent space matching process of a classification model according to an embodiment of the present disclosure.

FIG. 4 is an exemplary diagram conceptually illustrating a latent space matching process for a classification model according to an embodiment of the present disclosure.

In the latent space matching process, the training unit of the defect inspecting device 100 trains the classification model for seen data $S_0$ such that the latent vectors generated by both the classification model and the second classification model have mutual consistency. Based on a difference between a determination basis $z_1$ generated by the classification model using the seen data and a determination basis $z_2$ generated by the second classification model using the same seen data, the training unit defines a loss function $L_{match}(z_1, z_2)$. The training unit may update the parameters of the encoder 210 inside the classification model toward a direction in which the loss function $L_{match}$ is reduced. As described above, the parameters of the fully-connected layer 220 inside the classification model are still fixed.

Figure 5:
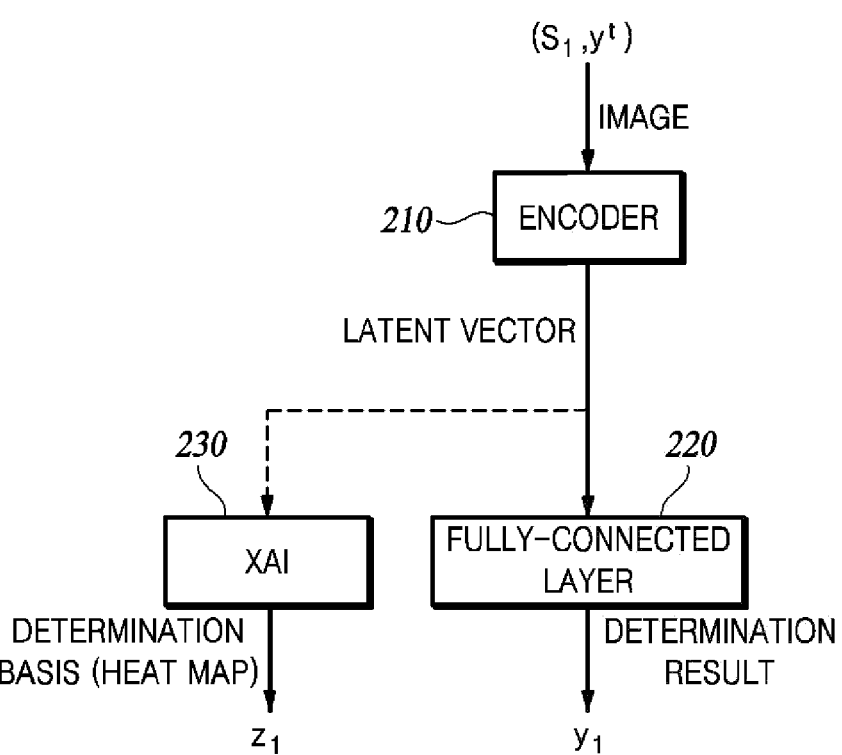
FIG. 5 is an exemplary diagram conceptually illustrating a fine-tuning process for a classification model according to an embodiment of the present disclosure.

FIG. 5 is an exemplary diagram conceptually illustrating a fine-tuning process for a classification model according to an embodiment of the present disclosure.

In the fine-tuning process, based on a difference between a determination result $(y_1)$ generated by the classification model using the unseen data $(S_1)$ and a corresponding target determination result $(y^r)$, the training unit defines a loss function $L_{class}(y_1, y^r)$. The training unit may update the parameters of the encoder 210 inside the classification model toward a direction in which the loss function $L_{class}$ is reduced. As described above, the parameters of the fully-connected layer 220 inside the classification model are still fixed.

The defect inspecting device 100 checks whether or not the performance of the classification model satisfies preset reference performance (S324). Here, the fact that the performance of the classification model satisfies the preset reference performance indicates, for example, that the loss function $L_{match}$ is reduced below a preset first reference value, and the loss function $L_{class}$ is reduced below a preset second reference value.

When the performance of the classification model does not satisfy the preset reference performance, the defect inspecting device 100 repeatedly performs training processes (S320 and S322) on the classification model.

When the performance of the classification model satisfies the preset reference performance, the defect inspecting device 100 copies parameters of the classification model to the second classification model, and includes the unseen data in the seen data (S310). The defect inspecting device 100 stores the second classification model, and updates the seen data, thereby terminating the training of the classification model.

A device (not illustrated) in which the defect inspecting device 100 according to the present embodiment is installed may be a programmable computer, and includes at least one communication interface connectable with a server (not illustrated).

The training for the classification model as described above can be performed in the device in which the defect inspecting device 100 is installed using the computing power of the device in which the defect inspecting device is installed. Alternatively, the training for the classification model may be performed at the server.

As described above, according to the present embodiment, by providing the defect inspecting device and method for providing a basis for determining a good/defective product provided by a deep learning-based classification model using explainable artificial intelligence, there is an effect that real-time adaptation to a cause of the defect caused by an environmental change, and a flexible countermeasure to a new type of defect are possible in view of utilization and maintenance of a deep learning algorithm.

Each flow chart according to the present embodiment is described as performing the processes in order, but it is not necessarily limited thereto. In other words, the flow chart is not limited to a time-series order, because it may be possible to change and perform the processes described in the flowchart or perform one or more processes in parallel.

Various embodiments of the systems and techniques described herein may be realized by a digital electronic circuit, an integrated circuit, a field programmable gate array (FPGA), an application specific integrated circuit (ASIC), computer hardware, firmware, software, and/or combinations thereof. These various embodiments may include being implemented by one or more computer programs executable on a programmable system. A programmable system includes at least one programmable processor (which may be a special purpose processor or a general purpose processor) coupled to receive data and commands from a storage system, at least one input device, and at least one output device and to transmit data and commands thereto. The computer programs (also known as programs, software, software applications, or code) include instructions for the programmable processor, and are stored in a "computer-readable recording medium".

The computer-readable recording medium includes all kinds of recording devices in which data capable of being read by the computer system is stored. This computer-readable recording medium may be a non-volatile or non-transitory medium such as a ROM, a CD-ROM, a magnetic tape, a floppy disk, a memory card, a hard disk, a magneto-optical disk, or a storage device. Further, the computer-readable recording medium may be distributed in the computer system connected by a network, so that the computer-readable code can be stored and executed in a distributed mode.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of operating a computing device for defect inspection, comprising:

a deep learning-based first classification model and a deep learning-based second classification model, wherein each of the first classification model and the second classification model includes an encoder, an explainable artificial intelligence (XAI), and a fully-connected layer, the encoder is configured to generate a latent vector from the image, the XAI is configured to generate the determination basis from the latent vector, and the fully-connected layer is configured to generate the determination result from the latent vector;

acquiring an image of a product to be inspected;

generating, using the first classification model, a determination result indicating whether the product is good or defective based on the acquired image;

providing a determination basis for the first classification model to generate the determination result using the XAI to generate a category set for the determination basis, wherein the first classification model has one or more parameters of a deep learning algorithm of the first classification model that are the same as one or more parameters of the second classification model that is pre-trained or stored in a data storage after being updated; and performing an adaptation process on the first classification model when the determination basis is determined as being an abnormal value for adapting the first classification model to the abnormal value by updating the parameters of the deep learning algorithm of the first classification model using the XAI to clarify the determination basis for determining whether the product is good or defective, wherein performing the adaptation process comprises:

updating the category set including a plurality of categories for the determination basis; and training the first classification model using the second classification model and the updated category set, and further wherein:

the second classification model is pre-trained using seen data for training and a corresponding target determination result, the category set is initialized by classifying the plurality of categories for the determination basis generated by the second classification model using the seen data, updating the category set comprises:

classifying, as unseen data, an image causing the first classification model to generate the abnormal value and the corresponding determination result; and causing the determination result corresponding to the abnormal value to be included in the corresponding target determination result, training the first classification model comprises:

performing a latent space matching using the seen data; and performing a fine-tuning using the unseen data, the latent space matching and fine-tuning are repeatedly performed on the first classification model until the performance of the first classification model satisfies a preset reference performance, performing the latent space matching includes updating the one or more parameters of the first classification model to reduce a first loss function, the first loss function being defined based on a difference between the determination basis generated by the first classification model using the seen data and the determination basis generated by the second classification model using the seen data, and performing the fine-tuning comprises updating the one or more parameters of the first classification model to reduce a second loss function, the second loss function being defined based on a difference between the determination result generated by the first classification model using the unseen data and the corresponding target determination result.

2. The method of claim 1, wherein the determination basis is determined as being the abnormal value when a difference between the determination basis and a representative value of each category included in the category set is greater than a preset reference value.

3. The method of claim 1, wherein training the first classification model comprises:

copying one or more parameters of the first classification model to the second classification model to update the second classification model; and causing the unseen data to be included in the seen data when the performance of the first classification model satisfies the preset reference performance.

4. A system for inspecting a defect, comprising:

a deep learning-based first classification model and a deep learning-based second classification model, wherein each of the first classification model and the second classification model includes an encoder, an explainable artificial intelligence (XAI), and a fully-connected layer, the encoder is configured to generate a latent vector from the image, the XAI is configured to generate the determination basis from the latent vector, and the fully-connected layer is configured to generate the determination result from the latent vector;

an input unit configured to acquire an image of a product to be inspected;

a product inspection unit configured to generate, using the deep first classification model, a determination result indicating whether the product is good or defective based on the acquired image, and to provide a determination basis for the first classification model to generate the determination result using the XAI to generate a category set for the determination basis, wherein the first classification model has one or more parameters of a deep learning algorithm of the first classification model that are same as one or more parameters of the second classification model that is pre-trained or stored in a data storage after being updated; and an adaptation unit configured to perform an adaptation process on the first classification model when the determination basis is determined as being an abnormal value for adapting the first classification model to the abnormal value by updating the parameters of the deep learning algorithm of the first classification model using the XAI to clarify the determination basis for determining whether the product is good or defective, wherein the adaptation unit comprises:

a category set generation unit configured to update the category set including a plurality of categories for the determination basis; and a training unit configured to train the first classification model using the second classification model and the updated category set, and further wherein:

the training unit is configured to perform a pre-training on the second classification model using seen data for training and a corresponding target determination result, the category set generation unit is configured to initialize the category set by classifying the plurality of categories for the determination basis generated by the second classification model using the seen data used for performing the pre-training, updating the category set comprises:

classifying, as unseen data, an image causing the first classification model to generate the abnormal value and the corresponding determination result; and causing the determination result corresponding to the abnormal value to be included in the corresponding target determination result, training the first classification model comprises:

performing a latent space matching using the seen data; and performing a fine-tuning using the unseen data, the latent space matching and fine-tuning are repeatedly performed on the first classification model until the performance of the first classification model satisfies a preset reference performance, performing the latent space matching includes updating the one or more parameters of the first classification model to reduce a first loss function, the first loss function being defined based on a difference between the determination basis generated by the first classification model using the seen data and the determination basis generated by the second classification model using the seen data, and performing the fine-tuning comprises updating the one or more parameters of the first classification model to reduce a second loss function, the second loss function being defined based on a difference between the determination result generated by the first classification model using the unseen data and the corresponding target determination result.

5. A non-transitory computer-readable recording medium storing instructions that, when executed by a processor, cause a processor to control a system to perform:

a deep learning-based first classification model and a deep learning-based second classification model, wherein each of the first classification model and the second classification model includes an encoder, an explainable artificial intelligence (XAI), and a fully-connected layer, the encoder is configured to generate a latent vector from the image, the XAI is configured to generate the determination basis from the latent vector, and the fully-connected layer is configured to generate the determination result from the latent vector;

acquiring an image of a product to be inspected;

generating, using the first classification model, a determination result indicating whether the product is good or defective based on the acquired image;

providing a determination basis for the first classification model to generate the determination result using the XAI to generate a category set for the determination basis, wherein the first classification model has one or more parameters of a deep learning algorithm of the first classification model that are same as one or more parameters of the second classification model that is pre-trained or stored in a data storage after being updated; and performing an adaptation process on the first classification model when the determination basis is determined as being an abnormal value for adapting the first classification model to the abnormal value by updating the parameters of the deep learning algorithm of the first classification model using the XAI to clarify the determination basis for determining whether the product is good or defective, wherein performing the adaptation process comprises:

updating the category set including a plurality of categories for the determination basis; and training the first classification model using the second classification model and the updated category set, and further wherein:

the second classification model is pre-trained using seen data for training and a corresponding target determination result, the category set is initialized by classifying the plurality of categories for the determination basis generated by the second classification model using the seen data, updating the category set comprises:

classifying, as unseen data, an image causing the first classification model to generate the abnormal value and the corresponding determination result; and causing the determination result corresponding to the abnormal value to be included in the corresponding target determination result, training the first classification model comprises:

performing a latent space matching using the seen data; and performing a fine-tuning using the unseen data, the latent space matching and fine-tuning are repeatedly performed on the first classification model until the performance of the first classification model satisfies a preset reference performance, performing the latent space matching includes updating the one or more parameters of the first classification model to reduce a first loss function, the first loss function being defined based on a difference between the determination basis generated by the first classification model using the seen data and the determination basis generated by the second classification model using the seen data, and performing the fine-tuning comprises updating the one or more parameters of the first classification model to reduce a second loss function, the second loss function being defined based on a difference between the determination result generated by the first classification model using the unseen data and the corresponding target determination result.

\* \* \* \* \*